United States Patent [19]

Shimozono et al.

[11] Patent Number: 4,599,583

[45] Date of Patent: Jul. 8, 1986

[54] MIXED DUAL FREQUENCY GENERATING SYSTEM

[75] Inventors: Ryoji Shimozono, Kawasaki; Yasunori Ogawa; Yasuo Tanaka, both of Yokohama; Shigeo Sano, Kawasaki, all of Japan

[73] Assignee: Fujitsu Limited, Kawasaki, Japan

[21] Appl. No.: 671,775

[22] Filed: Nov. 15, 1984

[30] Foreign Application Priority Data

Nov. 19, 1983 [JP] Japan .................................. 58-217101
Nov. 24, 1983 [JP] Japan .................................. 58-221009

[51] Int. Cl.⁴ ...................... H03B 28/00; H04L 27/12
[52] U.S. Cl. .................................... 332/9 R; 328/14; 332/16 R; 375/45; 375/62; 364/721
[58] Field of Search ............... 332/9 R, 16 R; 375/45, 375/62; 328/14; 364/721, 718

[56] References Cited

U.S. PATENT DOCUMENTS 4,346,448 8/1982 Insam et al. .................... 364/721 X
4,482,974 11/1984 Kovalick ........................ 364/721 X

FOREIGN PATENT DOCUMENTS 56-48746 5/1981 Japan ..................................... 375/62

OTHER PUBLICATIONS

Wittman et al, "A Hardware Multitone Digital Frequency Synthesizer", IEEE Trans. on Acoustics, Speech, and Signal Processing, vol. ASSP-27, Dec. 1979, pp. 804–809.
Multrier, "Tone Generator", IBM Technical Disclosure Bulletin, vol. 20, No. 12, May 1978, p. 5196.

Primary Examiner—Siegfried H. Grimm
Attorney, Agent, or Firm—Staas & Halsey

[57] ABSTRACT

A mixed dual frequency generating system for generating a digital FSK signal or a signal including two mixed frequencies includes a ROM which stores in consecutive addresses sampled data obtained by sampling a sine wave at a sampling frequency. The mixed dual frequency generating system also includes a data extracting circuit for extracting the sampled data from the ROM at the sampling frequency using an extracting step number. An output data fixing circuit changes alternate data extracted from the ROM to data "O", so that a signal having two mixed frequencies can be obtained.

11 Claims, 17 Drawing Figures

FSK SIGNAL $f_a = 980 Hz$
$f_z = 1180 Hz$

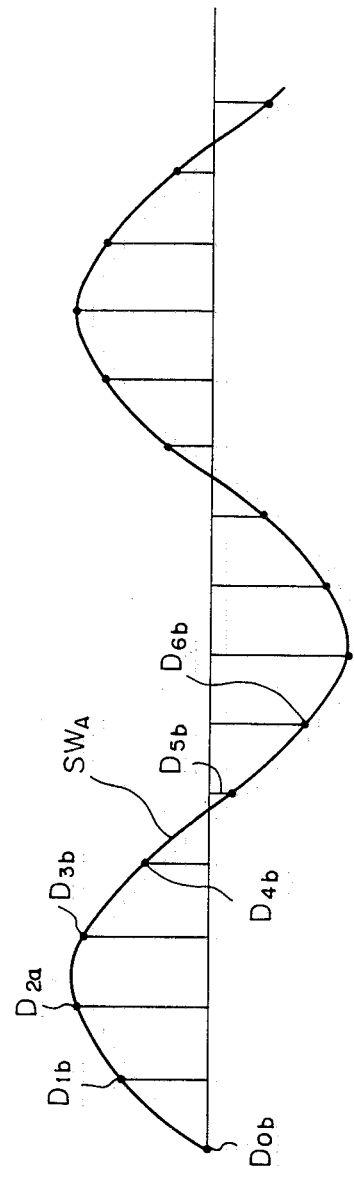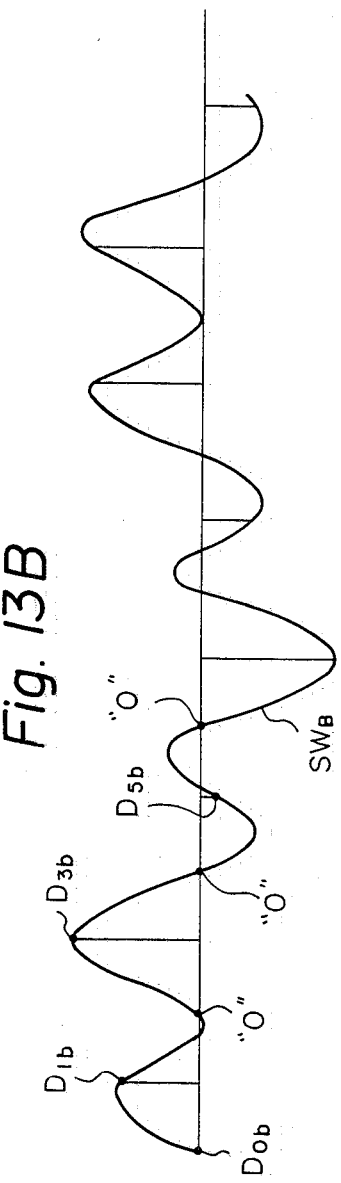

MIXED DUAL FREQUENCY GENERATING SYSTEM

BACKGROUND OF THE INVENTION (1) Field of the Invention

The present invention relates to a mixed dual frequency generating system for outputting a digital signal having, when converted into an analog signal, a desired frequency or frequencies. In particular, it relates to a mixed dual frequency generating system for providing a digital frequency-shift keying (FSK) signal or for providing a digital signal having, when converted into an analog signal, two mixed frequencies.

(2) Description of the Related Art

The transmission of analog FSK signal is disclosed in, for example, U.S. Pat. No. 4,368,439. In the field of telephone-line systems, however, wide use is made of PCM channels through which a so-called digital FSK signal is transmitted. The digital FSK signal consists of a sequence of binary coded signals expressing a logic "1" and a logic "0". Each of the binary coded signals in the digital FSK signal consists of a PCM signal obtained by sampling a sine wave. That is, the logic "1" in the digital FSK signal is formed by a PCM signal having, when converted into an analog signal, a first frequency, and the logic "0" in the digital FSK signal is formed by a PCM signal having, when converted into an analog signal, a second frequency, different from the first frequency. For example, according to CCITT, V21, the two frequencies are 980 Hz and 1180 Hz, respectively.

In a conventional digital FSK signal generating device, two PCM signal sources are employed for generating the above-mentioned two PCM signals. These two PCM signals are always generated from the two PCM signal sources, and a selection unit switches from one of the two PCM signals to the other PCM signal to be output from the device.

There are, however, disadvantages in the above conventional digital FSK signal generating device. That is, it needs two independent PCM signal sources, making it expensive, and at a switching point, these two PCM signals are not always in the same phase. Therefore, at the switching point, the phases of the PCM signals, or analog signals obtained from the PCM signal, usually become discontinuous, as later described in more detail. Because of this discontinuity, the digital FSK signal at the switching point has an impulse noise and, therefore, may be erroneously received at a receiver as noise or as another error signal.

Apart from the digital FSK signal generating device, a device for generating two mixed signals having different frequencies is useful for various applications. For example, in an examination of a modem, by applying a signal having two mixed frequencies, the characteristics for respective frequency components can be simultaneously examined. Also, a tone signal composed of two mixed frequencies is often used.

In order to generate such a signal having two mixed frequencies, a conventional technique is to provide two oscillators respectively generating frequencies different from each other. In this conventional case also, the need for two oscillators makes the device expensive.

A read only memory (ROM) may be used to obtain two signals having different frequencies by storing mixed data obtained by sampling two sine waves having different frequencies. By sequentially reading the ROM with a sampling period the mixed data can be read. In this case, however, it is impossible to change the frequencies of the output two signals because the stored mixed data are fixed data and are read step by step sequentially. Also, because the ROM must store mixed data for two different frequencies, the memory size of the ROM must be large.

SUMMARY OF THE INVENTION

An object of the present invention is to provide a digital signal generating device which can generate a digital FSK signal with no discontinuity in phase and amplitude.

Another object of the present invention is to provide a digital FSK signal generating device which can change the frequency of the output without a discontinuity in the phase of the PCM signal, thereby decreasing the possibility of erroneous detection at the receiving side.

Still another object of the present invention is to provide a mixed dual frequency generating system which can output two mixed signals having different frequencies without using two oscillators, but instead, using only a single ROM.

A still further object of the present invention is to provide a mixed dual frequency generating system which can output two mixed signals having different frequencies, and in which the frequencies are easily changed.

To achieve the above objects, there is provided, according to the present invention, a mixed dual frequency generating system comprising sampled data storing means for sequentially storing, in its continuous addresses, a plurality of digital sampled data obtained by sampling, with a predetermined sampling frequency, a fundamental sine wave having a fundamental frequency; extracting step number storing means for storing at least one extracting step number; and data extracting means for extracting, with the predetermined sampled frequency, a part of the digital sampled data from the sampled data storing means by accessing extracting addresses in the continuous addresses of the sampled data storing means. The extracting addresses are determined in such a way as to add the extracting step number to a previous extracting address to form a new extracting address.

The sampled data storing means stores data indicating a predetermined cycle portion of the fundamental sine wave. This predetermined cycle portion is at least equal to one quarter of one cycle of the fundamental sine wave.

The data extracting means comprises an extracting address latching means, and an extracting address calculating means.

The extracting address latching means operatively latches the previous extracting address until a first new extracting address is determined.

The extracting address calculating means operatively calculates the first new extracting address by adding the extracting step number to the previous extracting address output from the extracting address latching means.

According to one aspect of the present invention, the predetermined cycle portion is equal to, for example, a half cycle or even one cycle of the fundamental sine wave.

The device further comprises a control means for providing, when the first new extracting address is greater than or equal to the number of sampling steps in one cycle, a first control signal to the calculating means. The calculating means operatively calculates, in response to the first control signal, a second new extracting address by subtracting the number of sampling steps in one cycle from the first new extracting address.

The extracting address latching means operatively updates the previous extracting address by the first new extracting address when the first control signal is not applied to the calculating means or by the second new extracting address when the first control signal is applied to the calculating means.

According to another aspect of the present invention, the device further comprises means for changing every alternate first new extracting address to a predetermined extracting address. In the predetermined address of the sampled data storing means, the data "0" is stored.

BRIEF DESCRIPTION OF THE DRAWINGS

The above objects and features of the present invention will be more apparent from the following description of the preferred embodiments with reference to the accompanying drawings, wherein:

FIG. 13A is a waveform diagram illustrating a sine wave obtained from the device shown in FIG. 12;

FIG. 13B is a waveform diagram illustrating an analog signal including two frequencies which are also obtained from the device shown in FIG. 12;

DESCRIPTION OF THE PREFERRED EMBODIMENTS

Before describing the embodiments of the present invention, the background of the invention and the prior art and problems therein will first be described with reference to FIGS. 1 through 4.

Figure 1:
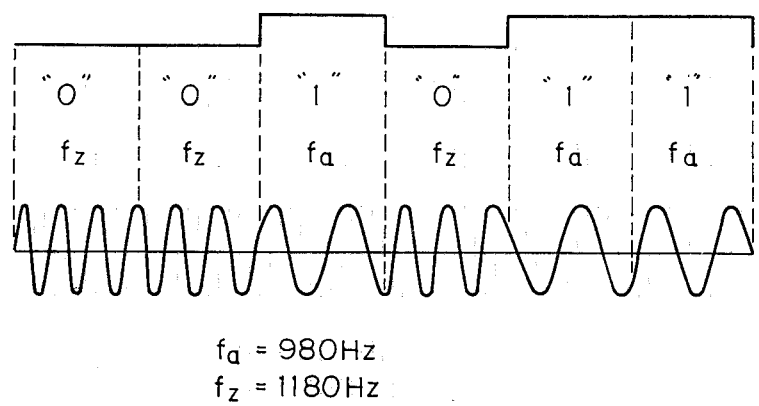
FIG. 1 is a waveform diagram for explaining a well-known FSK signal.

FIG. 1 shows a waveform diagram for explaining a well known FSK signal. As shown in FIG. 1, the FSK signal consists of a sequence of logical states, "1" and "0", of digital data to be sent. Each of the logical states of "1" consists, when the FSK signal is formed by PCM signals, of sampled data which has, when converted into an analog sine wave, a first frequency fa equal to 980 Hz in this example. Also, each of the logical states "0" in the digital FSK signal consists of sampled data having a second frequency fz equal to 1180 Hz in this example. Hereinafter, the term "the frequency of the digital sampled data" will refer to the frequency of the sine wave corresponding to the digital sampled data. These data samples are PCM signals. And thus, when the FSK signal is formed by the PCM signals, the FSK signal is referred as "digital" to distinguish it from the usual FSK signal whose logical values consist of an analog sine wave. The digital or analog FSK signal has advantages over a simple binary coded signal having high and low constant voltages of "1" and "0", in that the frequencies of the sine waves can be easily detected instead of the voltages, which may drop over a long distance.

Figure 2:
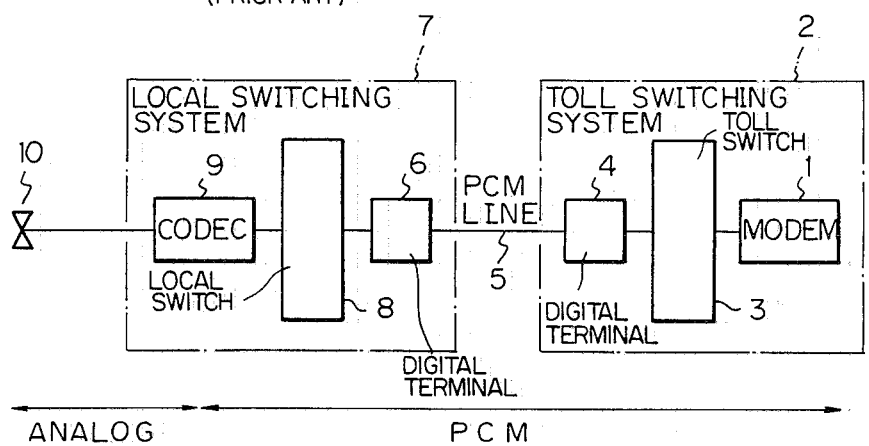
FIG. 2 is a block diagram of a well-known telephone-communication line system employing PCM channels for which the present invention is applicable.

FIG. 2 is a block diagram of a well-known telephone-communication line system employing PCM channels for which the present invention can be applied, and through which PCM channels the above-mentioned digital FSK signal is transmitted. In this system, a modulator-demodulator (MODEM) 1 in a toll switching system 2 should preferably generate a PCM signal such as the above-mentioned digital FSK signal, rather than the analog FSK signal. In FIG. 2, the modem 1 provides a digital FSK signal to a toll switch 3. The toll switch 3 selects a digital terminal 4 to transmit the digital FSK signal through a PCM line 5 to a digital terminal 6 at a local switching system 7. In the local switching system 7, the digital FSK signal from the digital terminal 6 is time division switched by a local switch 8. The output of the local switch 8 is converted into an analog signal by a coder-decoder (CODEC) 9. The analog signal is then applied to a subscriber 10. The system shown in FIG. 2 is applied to, for example, a detailed charging system for general telephone services in a hotel. In this case, the digital FSK signal on the PCM line 5 is transmitted at a low speed of 300 baud.

Figure 3:
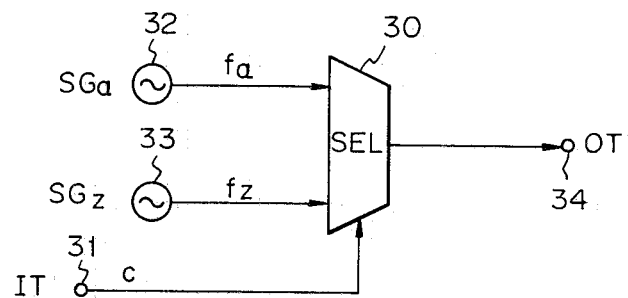
FIG. 3 is a block diagram of an example of a conventional digital FSK signal generating device.

FIG. 3 is a block diagram of an example of a conventional digital FSK signal generating device used in the prior art. In FIG. 3, a selecting unit (SEL) 30 selects, in response to a logical state of a command C consisting of a binary code applied to an input terminal (IT) 31, one of two PCM signals generated by two signal sources (SGa) 32 and (SGz) 33. The signal source (SGa) 32 always generates a PCM signal having a frequency fa, and the signal source SGz 33 always generates a PCM signal having a frequency fz. The selected PCM signal is output from an output terminal (OT) 34. Thus, by changing the command C, a digital FSK signal such as shown in FIG. 1 can be obtained. However, since the conventional device includes the two signal sources (SGa) 32 and (SGz) 33, it has a disadvantage in that it is too expensive, and further, since the phases of the two signals generated by the two signal sources 32 and 33 do not always coincide, the digital FSK signal includes, at its switching points from "0" to "1" or from "1" to "0", impulse noises. This will be explained in more detail with reference to FIG. 4.

Figure 4:
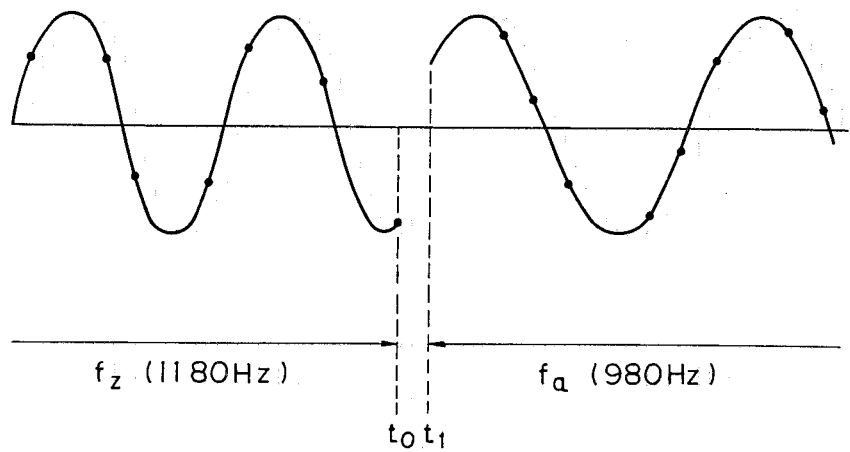
FIG. 4 is a waveform diagram for explaining the problems in the conventional device.

FIG. 4 is a waveform diagram illustrating a sequence of two sine waves which are obtained from the selecting unit (SEL) 30 shown in FIG. 3. The first sine wave $S_1$ has the high frequency fz, and the second sine wave $S_2$ has the low frequency fa. Between a time t0 and a time $t_1$, the first sine wave $S_1$ is switched to the second sine wave $S_2$. This switching is accomplished by changing the binary code of the command C applied to the input terminal (IT) 31 shown in FIG. 3. Since the phase and amplitude of the first sine wave $S_1$ does not coincide, at the time $t_0$ and of course at the time $t_1$, with the phase and amplitude of the second sine wave $S_2$, the wave forms $S_1$ and $S_2$ are discontinuous between the time $t_0$ and the time $t_1$. This discontinuity causes impulse noise at the receiver side, such as the subscriber 10 shown in FIG. 2.

Figure 5:
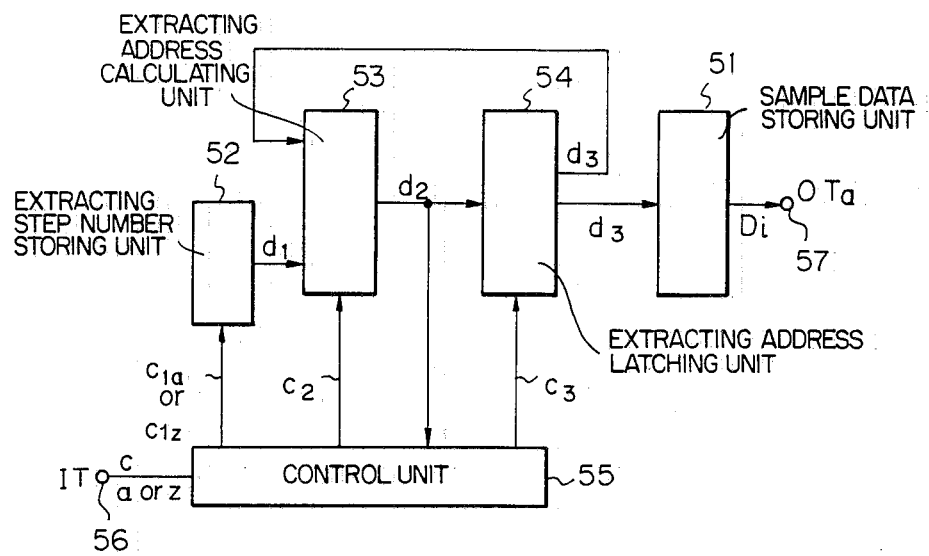
FIG. 5 is a block diagram of a digital FSK signal generating device, according to a first embodiment of the present invention.

FIG. 5 is a block diagram of a digital FSK signal generating device, according to a first embodiment of the present invention. In FIG. 5, a sampled data storing unit (SD) 51 is a read only memory (ROM) for sequentially storing, in its continuous addresses, a plurality of digital sampled data. These digital sampled data are obtained by sampling a fundamental sine wave for a predetermined cycle portion. The fundamental sine wave has a fundamental frequency $f_0$ which is a common measure or common divisor, as understood in mathematical terminology, of the two frequencies fa and fz in the desired digital FSK signal. For example, when the frequencies fa and fz of the digital FSK signal are 980 Hz and 1180 Hz, respectively, a common measure of, for example, 2.5 Hz, is selected as the fundamental frequency $f_0$ of the fundamental sine wave. The fundamental frequency $f_0$ may, of course, be another common measure such as 10 Hz, 20 Hz, etc. The sampling frequency f of the PCM signal in a telephone switching system is usually equal to 8 kHz which is twice the maximum voice frequency. In the simplest example, the predetermined cycle portion is equal to one cycle $C_0$ of the fundamental sine wave. In this example, the SD 51 in FIG. 5 stores one cycle $C_0$ of the fundamental sine wave.

Figure 6:
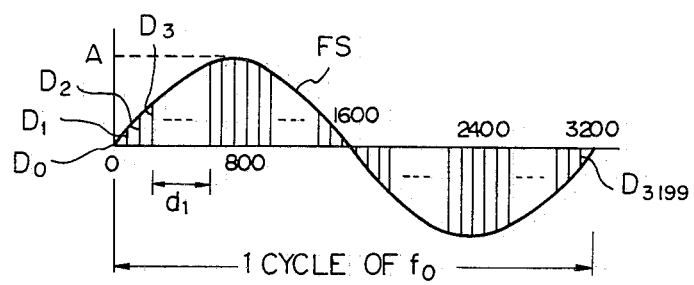
FIG. 6 is a plurality of digital sampled data obtained from a fundamental sine wave over one cycle.

FIG. 6 is a graph of a plurality of digital sampled data obtained from the fundamental sine wave for one cycle $C_0$. In FIG. 6, the fundamental sine wave FS has a fundamental frequency $f_0$ of 2.5 Hz. The sampling frequency f is 8 kHz. Therefore, the number of sampling steps in the one cycle $C_0$ of the sine wave FS is equal to $f/f_0$, i.e., 3200 steps. Also, the sampling period is 1/8000 second, i.e., 125 μs. Sampled values $D_0, D_1, D_2, D_3, \ldots, D_{3199}$ obtained by the sampling are stored sequentially as the digital sampled data in the sampled data storing unit (SD) 51 shown in FIG. 5.

Referring back to FIG. 5, the digital FSK signal generating device further includes an extracting step number storing unit (EN) 52, an extracting address calculating unit (ALU) 53, an extracting address latching unit (ADL) 54, and a control unit (CTL) 55.

The EN 52 stores two extracting step numbers $d_{1a}$ and $d_{1z}$ which are, in this embodiment, 392 and 472, respectively. The extracting step number $d_{1a}$ or $d_{1z}$ is represented by a notation "$d_1$" shown in FIG. 6. The extracting step numbers $d_{1a}$ and $d_{1z}$ are determined by dividing the frequencies fa and fz in the desired digital FSK signal with the fundamental frequency $f_0$. That is, in this embodiment, $d_{1a} = fa/f_0 = 980/2.5 = 392$ and; $d_{1z} = fz/f_0 = 1180/2.5 = 472$.

Figure 7:
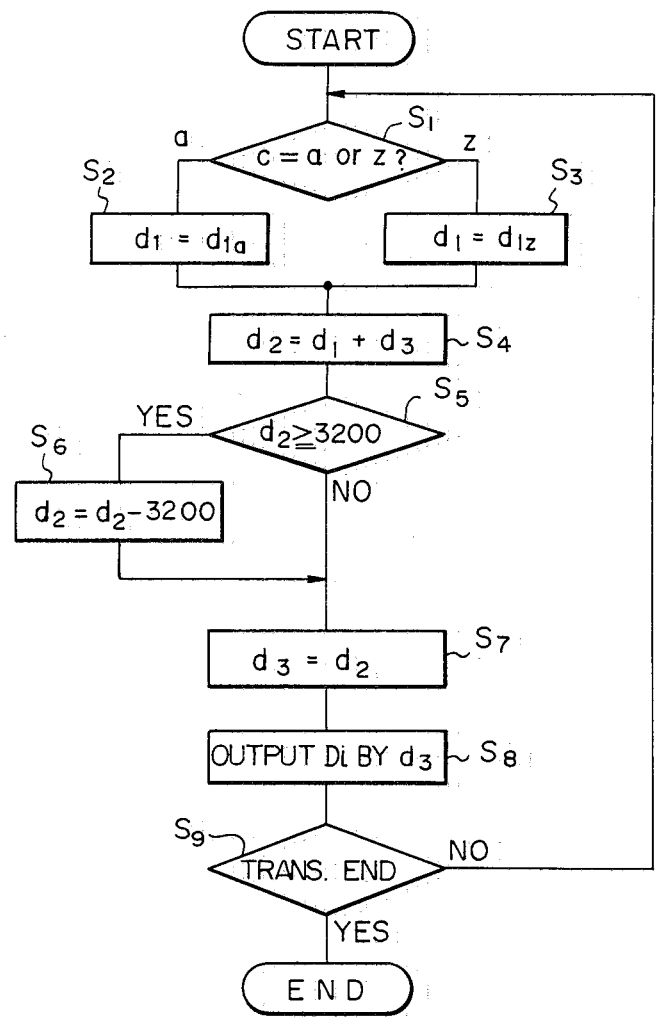
FIG. 7 is a flowchart explaining the operation of the device shown in FIG. 5.

FIG. 7 is a flowchart explaining the operation of the device shown in FIG. 5. Referring to FIGS. 5 and 7, at step $S_1$, the CTL 55 discriminates whether the command C applied to the input terminal (IT) 56 is a command "a" or "z" for specifying the first frequency fa or the second frequency fz to be output. The commands "a" and "z" are, for example, "1" and "0", respectively which are equal to the binary data to be sent from the device shown in FIG. 5 to the receiver.

If the binary code C is the command "a", the CTL 55 provides a control signal $C_{1a}$ to the EN 52 which, at step $S_2$, outputs the first extracting step number $d_{1a}$ as the extracting step number $d_1$, in response to the control signal $C_{1a}$. If the command C is the command "z", the CTL 55 provides a control signal $C_{1z}$ and the EN 52 outputs, at step $S_3$, the second extracting step number $d_{1z}$ as the extracting step number $d_1$.

At step $S_4$, the ALU 53 calculates a next extracting address $d_2$ by adding the extracting step number $d_1$ with a previous extracting address $d_3$ which has been latched in the ADL 54.

At step $S_5$, the CTL 55 discriminates whether the calculated extracting address $d_2$ output from the ALU 53 is greater than or equal to the number of sampling steps in the one cycle, i.e., the number of sampling steps in this embodiment is 3200.

If $d_2 \geq 3200$, then, at step $S_6$, the CTL 55 provides another control signal $C_2$ to the ALU 53, and the ALU 53 converts the extracting address $d_2$ into another new extracting address by subtracting the number of sampling steps (3200) from the new extracting address $d_2$. That is, $d_2$ is updated to $d_2 - 3200$.

After step $S_6$, or if $d_2 < 3200$ at step $S_5$, then the CTL 55 provides still another control signal $C_3$ to the ADL 54 so that, at step $S_7$, the ADL 54 latches the updated or original new extracting address $d_2$. Thus, the previous extracting address $d_3$ is updated to the updated or original new extracting address $d_2$, to form a current extracting address $d_3$ which is equal to $d_2$.

Then, at step $S_8$, the SD 51 is accessed by the current extracting address $d_3$ so that a sampled data $D_i$ stored in the address $d_3$ of the SD 51 is read and output.

At step $S_9$, the CTL 55 discriminates whether the transmission from the SD 51 should be ended. Until the transmission ends, the above mentioned steps $S_1$ through $S_8$ are repeated with the sampling frequency of 8 kHz. As a result, a digital FSK signal is obtained at the output terminal (OTa) 57.

Figure 8:
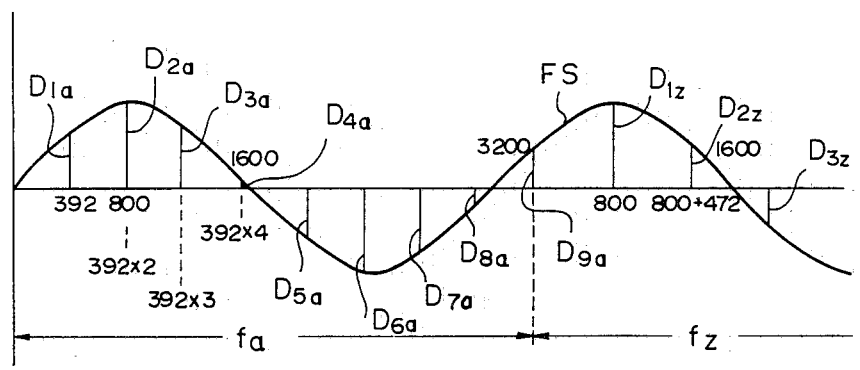
FIG. 8 is a graph of an example of the digital FSK signal extracted from the device shown in FIG. 5.

FIG. 8 is a graph of an example of the digital FSK signal extracted from the SD 51 shown in FIG. 5. As shown in FIG. 8, data $D_{1a}, D_{9a}, D_{3a}, \ldots$, and $D_{4a}$ are those extracted from the SD 51 when the extracting step number is $d_{1a}$ equal to 392. In this case, the extracting addresses $d_1 + d_3$ are sequentially calculated as 0, $392 + 0 = 392$, $392 + 392 = 784$, ..., and 3528. The extracting address 3528 for extracting the data $D_{9a}$ is greater than 3200. Therefore, the address 3528 is converted into $3528 - 3200$, i.e., 328. On the other hand, data $D_{1z}, D_{2z}, D_{3z}, \ldots$ are those extracted from the SD 51 when the extracting step number is $d_{1z}$ which is equal to 472. In this case, each of the extracting addresses for extracting the data $D_{1z}, D_{2z}, \ldots$ is calculated by adding the extracting step number 472 to the previous extracting address. For example, the extracting address for extracting the data $D_{1z}$ is equal to $328 + 472 = 800$. In the same way, the extracting address $d_{2z} = 800 + 472 = 1272$, and so force. These data $D_{1a}, D_{9a}, \ldots, D_{4a}, D_{1z}, D_{2z}, \ldots$ are extracted from the SD 51 with a frequency equal to the sampling frequency f of the fundamental sine wave data FS. That is, the extracting period for extracting these data is equal to the sampling i.e., $1/f = 125$ μs. Since the data $D_{1a}, D_{2a}, \ldots,$ and $D_{9a}$ are extracted from each $d_{1a} = 392$ step in the fundamental sine wave data stored in the SD 51, and since the fundamental sine wave data has the fundamental frequency $f_0 = 2.5$ Hz, the extracted PCM signal constituting the extracted data $D_{1a}, D_{2a}, \ldots,$ and $D_{9a}$ has a frequency equal to $d_{1a} \times f_0 = 392 \times 2.5 = 980$ hz. Thus, the PCM signal has the first frequency fa equal to 980 Hz, corresponding to, for example, "1" of the binary data and in the digital FSK signal to be sent to the receiver. Similarly, the extracted PCM signal constituting the extracted data $D_{1z}, D_{2z}, D_{3z}, \ldots$ has has the second frequency fz equal to $472 \times 2.5 = 1180$ Hz, corresponding to, for example, "0" of the binary data to be sent. It should be noted that the term "digital" in the digital FSK signal does not relate to the binary data but relates to the PCM signal.

Instead of storing a full cycle $C_0$ ($2\pi$ radians) of the fundamental sine wave FS in the SD 51, it is possible to store only a ½ cycle or even a ¼ cycle ($\pi/2$ radians) of the fundamental sine wave FS.

Figure 9:
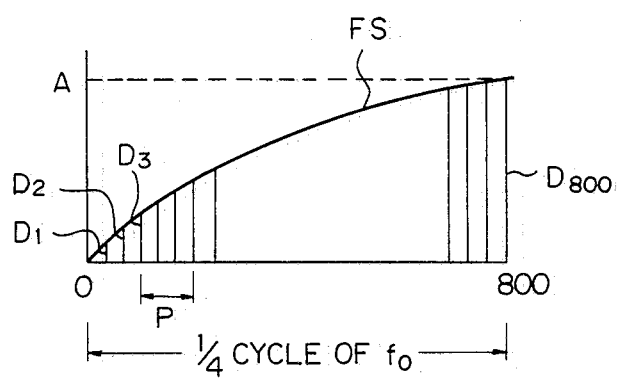
FIG. 9 is a graph of the digital sampled data obtained from a ¼ cycle of the fundamental sine wave.

FIG. 9 shows the digital sampled data obtained from a ¼ cycle of the fundamental sine wave FS. As shown in FIG. 9, 801 data samples $D_0, D_1, D_2, D_3, \ldots,$ and $D_{800}$ are obtained from the first ¼ cycle of the fundamental sine wave FS. The sampling period for obtaining the data samples $D_0, D_1, \ldots,$ and $D_{800}$ is the same as that shown in FIG. 6, i.e., 125 μs.

Figure 10:
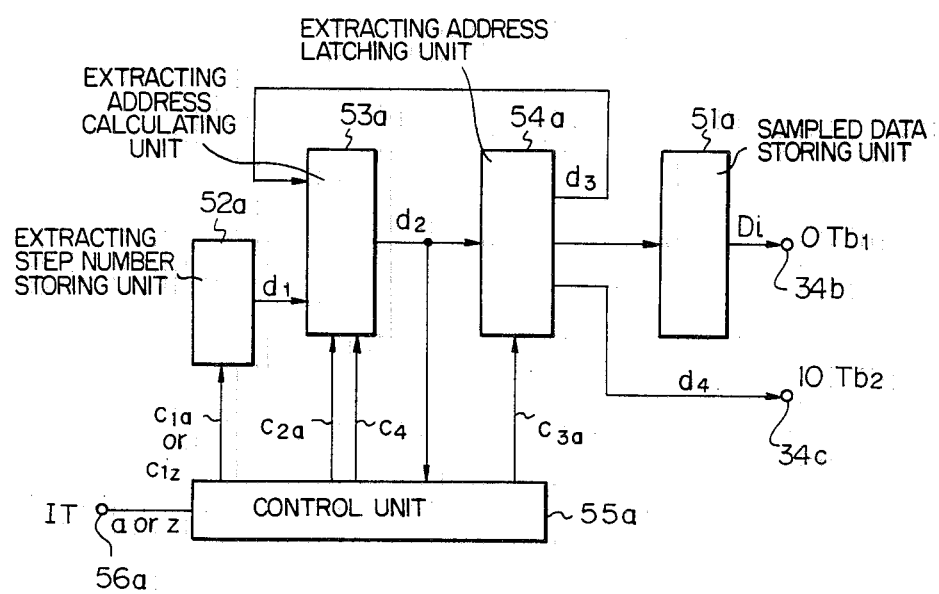
FIG. 10 is a block diagram of a digital FSK signal generating device according to a second embodiment of the present invention.

FIG. 10 is a block diagram of a digital FSK signal generating device according to a second embodiment of the present invention. In FIG. 10, the device comprises a sampled data storing unit (SD) 51a, an extracting number storing unit (EN) 52a, an extracting address calculating unit (ALU) 53a, an extracting address latching unit (ADL) 54a, and a control unit (CTL) 55a, which are similar to those shown in FIG. 5 of the first embodiment.

The SD 51a stores the sampled data $D_0, D_1, D_2, \ldots,$ and $D_{800}$ obtained from the first ¼ cycle of the fundamental sine wave FS shown in FIG. 9. Because of this, the operation of the device shown in FIG. 10 is slightly different from that of the first embodiment.

Figure 11:
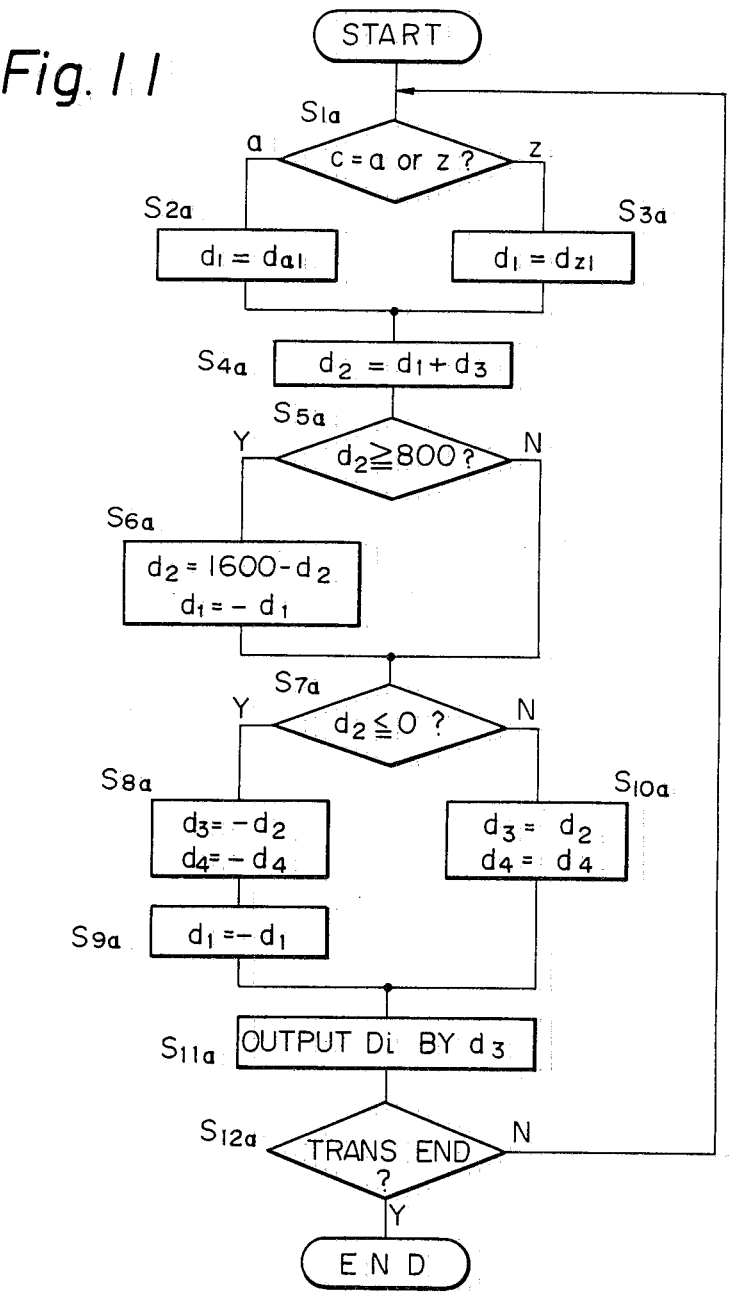
FIG. 11 is a flowchart explaining the operation of the device shown in FIG. 10.

FIG. 11 is a flowchart explaining the operation of the device shown in FIG. 10. Referring to FIGS. 10 and 11, steps $S_{1a}$ through $S_{4a}$ are the same as the steps $S_1$ through $S_4$ shown in FIG. 7. At step $S_{5a}$, the CTL 55a discriminates whether the calculated extracting address $d_2$ is greater than or equal to the number of sampling steps in the ¼ cycle ($C_0/4$), i.e., whether $d_2$ is at a phase more than $\pi/2$.

If $d_2 \geq 800$, i.e., if $d_2$ is at a phase more than $\pi/2$, then, at step $S_{6a}$, the CTL 55a provides a control signal $C_{2a}$ to the ALU 53a, which then converts the extracting address $d_2$ into another new extracting address by calculating $1600 - d_2$. Also, in response to the control signal $C_{2a}$, the ALU 53a inverts the sign of the extracting step number $d_1$ output from the EN 52a.

After step $S_{6a}$ or if $d_2 < 800$ at step $S_{5a}$, the CTL 55 discriminates, at step $S_{7a}$, whether the calculated extracting address $d_2$ is equal to or smaller than zero.

If $d_2 \leq 0$ at step $S_{7a}$, then, at step $S_{8a}$, the CTL 55a provides still another control signal $C_{3a}$ to the ADL 54a. In response to the control signal $C_{3a}$, the ADL 54a inverts the sign of the thus calculated extracting address $d_2$ and latches it as an extracting address $d_3$. Also, in reponse to the control signal $C_{3a}$, the ADL 54a changes a sign code $d_4$ of the extracted sampled data $D_i$. Accordingly, at step $S_{8a}$, the operations $d_3 = -d_2$, and $d_4 = -d_4$ are carried out in the ADL 54a. After step $S_{8a}$, the CTL 55a provides a still further control signal $C_4$ to the ALU 53a, which then inverts the sign of the extracting step number $d_1$.

If $d_2 > 0$ at step $S_{7a}$, then, at step $S_{10a}$, the ADL 54a latches the thus calculated extracting address $d_2$ as the extracting address $d_3$, and outputs the noninverted sign code $d_4$.

At step $S_{11a}$, the SD 51a is accessed by the extracting address $d_3$ so that a sampled data $D_i$ stored in the address $d_3$ is output from the SD 51a to an output terminal $OT_{b1}$. Also, the sign code $d_4$ is output from the ADL 54a to another output terminal $OT_{b2}$. In practice, the data ($D_i \times d_4$) is output from the device shown in FIG. 10.

The above-mentioned steps $S_{1a}$ through $S_{11a}$ are repeated with the sampling frequency of 8 kHz until transmission end is detected by the CTL 55a at step 12a.

According to the above-described first and second embodiments, because the frequency of the digital FSK signal is changed by changing the extracting step number, the phases of the PCM signals or analog signals obtained from the PCM signals are not discontinuous. Therefore, at a receiver, the digital FSK signal is received with decreased noise or with no error.

Figure 12:
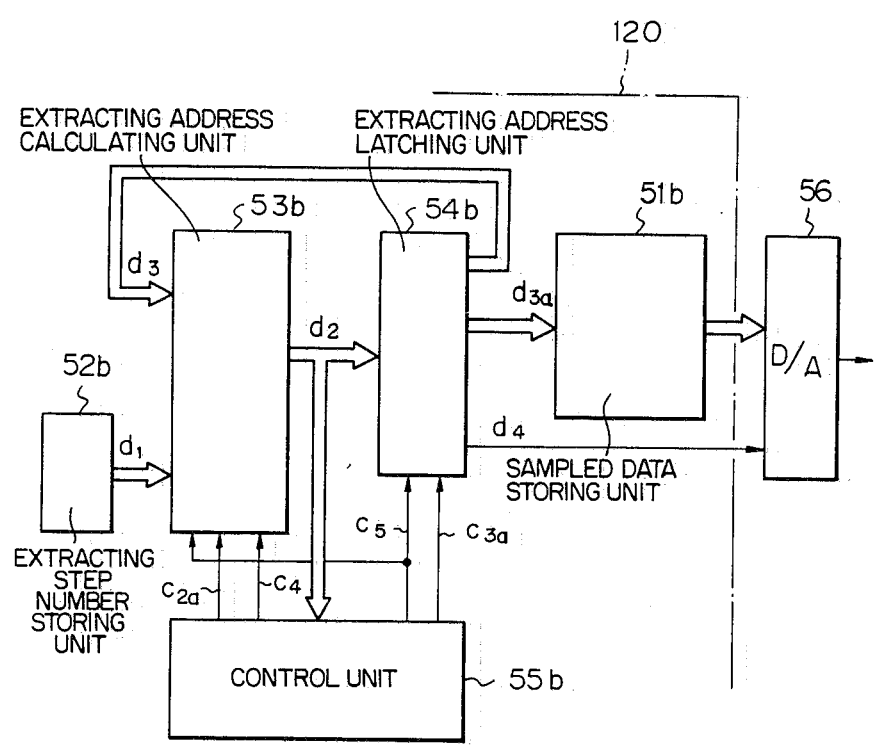
FIG. 12 is a block diagram illustrating a digital signal generating device according to a third embodiment of the present invention.

FIG. 12 is a block diagram illustrating a mixed dual frequency generating system 120 according to a third embodiment of the present invention. The device shown in FIG. 12 is for generating a digital signal which has, when converted into an analog signal, two mixed frequencies. In FIG. 12, the mixed dual frequency generating system 120 comprises an SD 51b, an EN 52b, an ALU 53b, an ADL 54b, and a CTL 55b which are similar to those shown in FIG. 10. The output of the SD 51b is connected to a D/A converter 56. The main differences from the second embodiment are that, in FIG. 12, the EN 52b stores only a single extracting step number $d_1$, and that the CTL 55b controls the ADL 54b so that the ADL 54b outputs a fixed address alternately as an output address $d_{3a}$. In the fixed address of the SD 51b, the data "0" is stored. Thus, from the output of the SD 51b, the data "0" is output at alternate outputs. When the D/A converter 56 converts the digital data including "0" in alternate data, the analog signal obtained at the output of the D/A converter 56 includes two frequencies.

Assume that the SD 51b stores sampled data $D_{1b}, D_{2b}, D_{3b}, \ldots$ obtained from the first ¼ cycle of a sine wave having a frequency $f_0$, as shown in FIG. 9. When the sampled data $D_{1b}, D_{2b}, D_{3b}, \ldots$ are sequentially read, with the extracting step number $d_1$, from the SD 51b in a way similar to that mentioned with reference to FIG. 11 of the second embodiment, i.e., where $d_3$ is always equal to $d_{3a}$, and when the read sampled data are converted into an analog signal by the D/A converter 56, a sine wave data $SW_A$ having a frequency equal to $f_0 \times d_1$ can be obtained as shown in FIG. 13A.

Conversely, when alternate outputs from the SD 51b are made "0", that is, when the data "0" is output from the SD 51b instead of outputting the sampled data $D_{2b}, D_{4b}, D_{6b}, \ldots$ corresponding to values of $d_3$, the D/A converter converts the digital data $D_{1b}$, "0", $D_{3b}$, "0", $D_{5b}$, "0", $\ldots$ into an analog signal $SW_B$, as shown in FIG. 13B. The analog signal $SW_B$ contains two frequencies $f_1$ and $f_2$. When the sampling frequency f is 8 kHz, then the two frequencies $f_1$ and $f_2$ are $f_0 \times d_1$ and 4 kHz$-f_0 \times d_1$. For example, assume that the fundamental frequency $f_0$ of the fundamental sine wave is 2.5 Hz, and that the extracting step number $d_1$ is 500, then the two frequencies are 1250 Hz and 2750 Hz.

Figure 14:
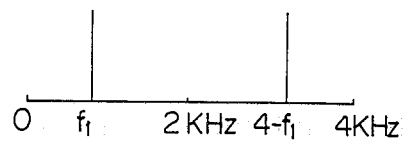
FIG. 14 is a graph of a frequency spectrum of the two signals included in the analog signal shown in FIG. 13B.

FIG. 14 shows a frequency spectrum of the two signals included in the analog signal $SW_B$. As shown in FIG. 14, the two frequencies $f_1$ and $f_2=4$ kHz$-f_1$ are placed symmetrically with respect to 2 kHz, and the two frequencies are present within 4 kHz.

This can be theoretically proven as follows. Assume again that the sampling frequency f is 8 kHz, and that the fundamental frequency of the fundamental sine wave is $f_0$: Then the digital sampled data $D_{nb}$ is $$\sin\left(2\pi \times \frac{f_0 \times d_1}{8000} \times n\right).$$

Consider another fundamental sine wave having a fundamental frequency equal to $4000-f_1$. Then the digital sampled data $D_{nc}$ is $$\sin\left\{2\pi \times \frac{(4000-f_0) \times d_1}{8000} \times n\right\}.$$

For the sake of simplicity, assume $2\pi f_0 d_1/8000 = \theta$. Then, $$D_{nb} + D_{nc} = \sin\theta n + \sin(\pi - \theta)n$$
$$= \sin\theta n + \sin\pi n \cdot \cos\theta n - \sin\theta n \cdot \cos\pi n$$
$$= (1 - \cos\pi n)\sin\theta n$$

If n is an odd number, $$D_{nb}+D_{nc}=2 \sin \theta n$$

If n is an even number, $$D_{nb}+D_{nc}=0$$

Accordingly, by making alternate extracted data from the SD 51b to be "0", the analog signal at the output of the D/A converter 56 becomes the superimposition of two sine waves having the frequencies $f_0 d_1$ and 4 kHz$-f_0 d_1$, respectively.

Referring back to FIG. 12, the operation of the device 120 is almost the same as the operation of the device shown in FIG. 10. Therefore, the control signals $C_{2a}$, $C_{3a}$, and $C_4$, and the extracting addresses $d_2$ and $d_3$, are the same as those in FIG. 10. The differences between the devices in FIGS. 10 and 12 are that, in FIG. 12, the EN 52b is not controlled by the CTL 55b but provides the predetermined single extracting step number $d_1$, and that the CTL 55b provides a still further control signal $C_5$ to the ALU 53b and to the ADL 54b for every other output of the calculated extracting address $d_2$.

Figure 15:
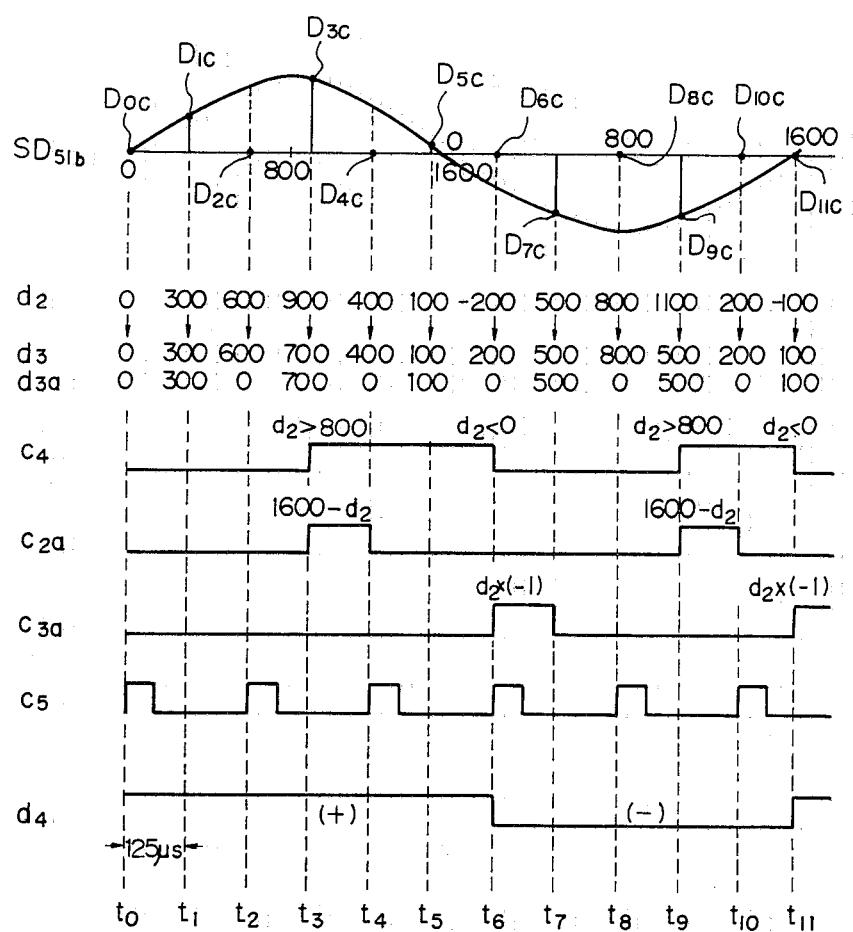
FIG. 15 is a diagram explaining the operation of the device shown in FIG. 12.

FIG. 15 is a diagram explaining the operation of the device shown in FIG. 12. In FIG. 15, the SD 51b outputs digital data $D_{0c}$, $D_{1c}$, $D_{2c}$, . . . at times $t_0$, $t_1$, $t_2$, . . ., respectively. Alternate data $D_{1c}$, $D_{3c}$, $D_{5c}$, . . . are "0". The extracting period is equal to the sampling period, i.e., 125 $\mu$s. The extracting number $d_1$ is assumed to be 300. The control signal $C_5$ becomes "1" at alternate times $t_0$, $t_2$, $t_4$, $t_6$, . . . . Because of this, the extracting address $d_{3a}$ output from the ADL 54b is made to be zero at alternate times $t_0$, $t_2$, $t_4$, $t_6$, . . . . The control signal $C_4$ is turned from "0" to "1" when the calculated address $d_2$ output from ALU 53b becomes greater than the number of sampling steps in the range between 0 and $\pi/2$ in phase, i.e., when $d_2$ becomes greater than 800. The control signal $C_4$ is turned from "1" to "0" when $d_2$ becomes negative, and the control signal $C_{3a}$ is turned from "0" to "1" when the control signal $C_4$ changes its logic level, and the "1" level of the control signal $C_{3a}$ continues for the sampling period of 125 $\mu$s. The level of the sign code $d_4$ changes when the control signal $C_4$ changes from "1" to "0".

At the time $t_0$, $d_2$ and $d_3$ are both preset values equal to zero in this example. Since $C_5$ is "1", $d_{3a}$ for accessing the SD 51b is zero.

At the time $t_1$, $d_2$ is calculated as $d_1+d_3$, i.e., $d_2=300$. Also, $d_3=d_2=300$. Since $C_5$ is "0", $d_{3a}=d_3=300$.

At the time $t_2$, $d_2$ is $d_1+d_3=600$, and $d_3=d_2=600$. Since $C_5=$ "1", $d_{3a}=$zero.

At the time $t_3$, $d_2=d_1+d_3=300+600=900$. Since $d_2>800$, the control signal $C_{2a}$ rises. Thus, $d_3=1600-d_2=700$. $d_{3a}=d_3$ because $C_5$ is "0". Also, since $d_2>800$, the control signal $C_4$ rises. While $C_4$ is "1", the extracting step number $d_1=-300$.

At the time $t_4$, $C_{2a}$ returns to "0", and $C_5$ returns to "1"; $d_2$ is $d_1+d_3=-300+700=400$; $d_3$ is updated to 400; and since $C_5$ is "1", $d_{3a}$ is zero.

At the time $t_5$, $d_2$ is calculated as $d_1+d_3=-300+400=100$. Since $C_5$ is "0", $d_3$ and $d_{3a}$ are equal to $d_2$, i.e., 100.

At the time $t_6$, $d_2$ is calculated as $d_1+d_3=-300+100=-200$. Since $d_2$ is negative, $C_{3a}$ rises and $C_4$ falls. In response to the rise of $C_{3a}$, $d_4$ falls and the negative sign is applied to the D/A converter 56 (FIG. 12). Because $C_4$ is "0", $d_1$ is changed from $-300$ to $+300$, and $d_3$ is updated to $-200$. Then because $C_{3a}$ is "1", $d_3$ is further changed to $+200$, and because $C_5$ is "1", $C_{3a}$ is zero.

At the time $t_7$, $d_2$ is calculated as $d_1+d_3=300+200=500$. Thus $d_3$ is updated to 500, and since $C_5$ is "0", $d_{3a}=d_3=500$.

At the times $t_8$, $t_9$, $t_{10}$, $t_{11}$, . . . , the extracting addresses $d_2$, $d_3$, and $d_{3a}$ can be calculated in a way similar to the above.

Where the extracting step number $d_1$ is 300, two frequencies, i.e., $300 \times 2.5 = 750$ Hz and $4000-750=3250$ Hz, are mixed in the output analog signal from the D/A converter 56.

The extracting step number $d_1$ can be arbitrarily set in the EN 52b. Also, the sampling frequency f can be arbitrarily selected. Therefore, the two frequencies $f_0 \times d_1$ and $f/2-f_0 \times d_1$ can be arbitrarily changed.

Figure 16:
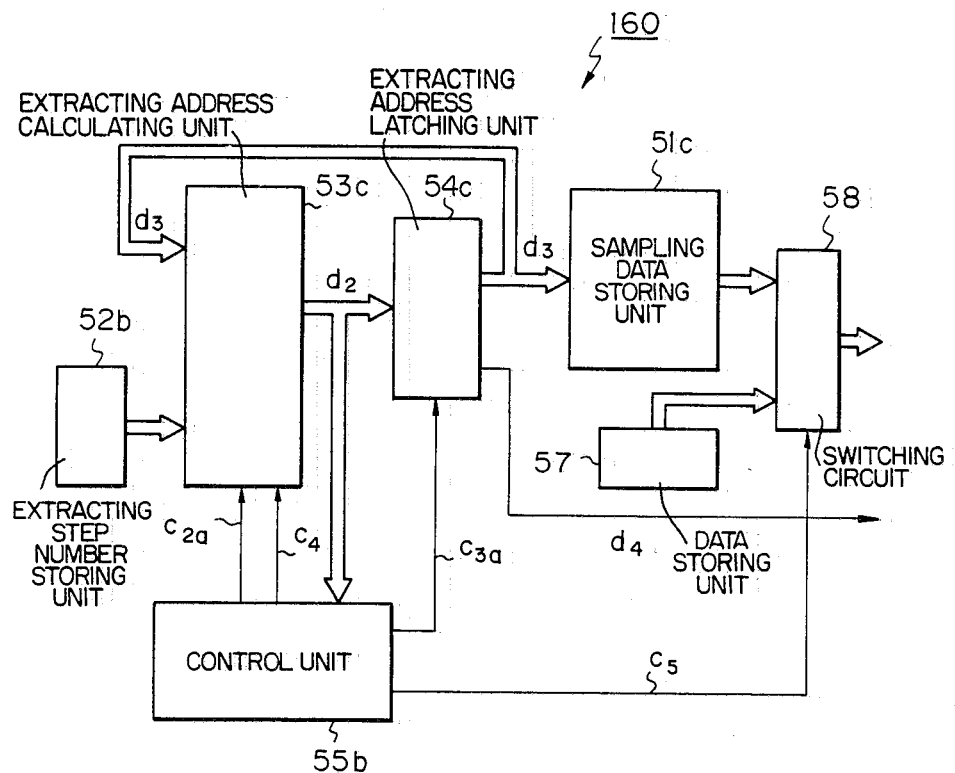
FIG. 16 is a block diagram of a digital signal generating device according to a fourth embodiment of the present invention.

FIG. 16 is a block diagram of a mixed dual frequency generating system 160 according to a fourth embodiment of the present invention. The mixed dual frequency generating system 160 shown in FIG. 16 is very similar to the device 120 shown in FIG. 12. The same portions, signals, and extracting addresses are represented by the same reference symbols in both FIGS. 12 and 16. The differences between FIGS. 12 and 16 are that, instead of accessing the address zero in alternate accessing timings, the device shown in FIG. 16 has a data storing unit (DS) 57 for storing the fixed data "0", and a switching circuit 58 for selecting the output of the SD 51c, or the output of the DS 57, in response to the control signal $C_5$ which turns to "1" at alternate extracting timings, as shown in FIG. 15. It is apparent that the device shown in FIG. 16 can also provide a digital signal including the arbitrarily determined two frequencies $f_0 \times d_1$ and $f/2 - f_0 \times d_1$.

The present invention is not restricted to the above described embodiments. Various changes and modifications are possible. For example, in place of changing the alternate extracting addresses $d_{3a}$ to be "0", as described with reference to FIG. 12, an address generating unit for generating the fixed address for accessing the "0" data may be provided between the ADL 54b and the SD 51b so that, instead of the fixed address from the ADL 54b, the fixed address from the address generating unit may be applied to the SD 51b.

From the foregoing description, according to the present invention, a digital signal generating device can generate a digital FSK signal with no discontinuity in phase and amplitude. Therefore, at a receiving side, the digital FSK signal is received with decreased noise and with a decrease in the number of errors detected.

Further, the digital signal generating device, according to the present invention, can output two mixed digital signals from a single ROM so that the cost of the device is decreased in comparison with the conventional device employing two oscillators.

Still further, the frequency of the digital FSK signal or the frequencies of the two mixed frequencies can be easily changed.

Accordingly, the present invention is advantageous in, for example, telephone-communication line systems employing PCM channels.

We claim:

1. A mixed dual frequency generating system comprising:
    sampled data storing means, having an output, for storing in consecutive addresses a plurality of digital sampled data obtained by sampling at a predetermined sampling frequency a fundamental sine wave having a fundamental frequency to produce a number of sampling steps equal to one cycle of the fundamental sine wave;
    extracting step number storing means for storing at least one extracting step number;
    extracting address latching means for latching a first extracting address representing one of the consecutive addresses corresponding to one of the digital sampled data to be extracted from said sampled data storing means;
    extracting address calculating means for adding the extracting step number to the first extracting address to generate a second extracting address, the second extracting address being generated at a rate equal to the predetermined sampling frequency;
    control means for supplying a first control signal to said extracting address calculating means when the second extracting address is at least as large as the number of sampling steps in one cycle of the fundamental sine wave, said extracting address calculating means responding to the first control signal by subtracting the number of sampling steps from the second extracting address to generate a third extracting address, said control means causing the third extracting address to be stored in said extracting address latching means as the first extracting address when the first control signal is generated and otherwise causing the second extracting address to be stored in said extracting address latching means as the first extracting address; and output data fixing means for making alternate sampled data extracted from said sampled data storing means to be data "0".

2. A mixed dual frequency generating system as set forth in claim 1,
    wherein said output data fixing means comprises said extracting address latching means and said control means,
    wherein said control means provides a second control signal to said extracting address latching means at alternate extracting timings, and
    wherein said extracting address latching means provides to said sampled data storing means, in response to the second control signal, a predetermined extracting address specifying the data "0".

3. A mixed dual frequency generating system as set forth in claim 1,
    wherein said control means further provides a second control signal at alternate extracting timings, and
    wherein said output data fixing means comprises:
        said control means;
        fixed data storing means for generating the data "0" at an output; and
        switching means for switching, in response to the second control signal, between the outputs of said sampled data storing means and said fixed data storing means.

4. A mixed dual frequency generating system comprising:
    sampled data storing means, having an output, for storing in consecutive addresses a plurality of digital sampled data obtained by sampling at a predetermined sampling frequency a fundamental sine wave having a fundamental frequency to produce a number of sampling steps equal to one-quarter of one cycle of the fundamental sine wave;
    extracting step number storing means for storing at least one extracting step number;
    extracting address latching means for supplying an output sign and latching a first extracting address representing one of the consecutive addresses corresponding to one of the digital sampled data in said sampled data storing means;
    extracting address calculating means for calculating a second extracting address by adding the extracting step number to the first extracting address, the second extracting address being generated at a rate equal to the predetermined frequency;
    control means for supplying a first control signal to said extracting address calculating means when the second extracting address is at least as large as the number of sampling steps and supplying a second control signal to said extracting address latching means when the second extracting address is negative, said extracting address calculating means responding to the first control signal by subtracting the second extracting address from two times the number of sampling steps to produce a third extracting address and inverting the sign of the extracting step number until the second control signal is generated, said extracting address latching means responding to the first control signal by storing the third extracting address as the first extracting address and otherwise storing the second extracting address as the first extracting address, and said extracting address latching means responding to the second control signal by inverting the output sign and multiplying negative one times the second extracting address prior to storing as the first extracting address; and output data fixing means for making alternate sampled data extracted from said sample data storing means to be data "0".

5. A mixed dual frequency generating system as set forth in claim 4, wherein said output data fixing means comprises said extracting address latching means and said control means, wherein said control means provides a third control signal to said extracting address latching means at alternate extracting timings, and wherein said extracting address latching means provides, in response to the third control signal, a predetermined extracting address for specifying the data "0".

6. A mixed dual frequency generating system as set forth in claim 4, wherein said control means further provides a third control signal at alternate extracting timings, and wherein said output data fixing means comprises:

said control means;

fixed data storing means for generating the data "0" at an output; and switching means for switching, in response to the third control signal, between the outputs of said sampled data storing means and said fixed data storing means.

7. A mixed dual frequency generating system comprising:

sampled data storing means, having an output, for storing in consecutive addresses a plurality of digital sampled data obtained by sampling, at a predetermined sampling frequency, a fundamental sine wave having a fundamental frequency;

extracting step number storing means for storing at least one extracting step number;

data extracting means for extracting, at the predetermined sampling frequency, output data from the digital sampled data stored in said sampled data storing means by accessing extracting addresses of said sampled data storing means, the extracting addresses being calculated by adding the extracting step number to a first extracting address to form a second extracting address and then assigning the second extracting address to the first extracting address; and output data fixing means for outputting data "0" at alternate extracting timings.

8. A mixed dual frequency generating system as set forth in claim 7, wherein said sampled data storing means stores a number of sampling steps equal to an integer multiple of one-quarter of one cycle of the fundamental sine wave.

9. A mixed dual frequency generating system as set forth in claim 8, wherein said data extracting means comprises:

extracting address latching means for latching the first extracting address until the second extracting address is calculated; and extracting address calculating means for calculating the second extracting address by adding the extracting step number to the first extracting address.

10. A mixed dual frequency generating system as set forth in claim 9, wherein said output data fixing means comprises:

said extracting address latching means; and control means for supplying a control signal to said extracting address latching means at the alternate extracting timings to output a predetermined extracting address for specifying the data "0".

11. A mixed dual frequency generating system as set forth in claim 7, wherein said output data fixing means comprises:

fixed data storing means for generating the data "0";

switching means for selecting between the data "0" from said fixed data storing means and one of the items of digital sampled data extracted by the first extracting address; and control means for supplying a control signal to said switching means to control the selection of the data "0" at the alternate extracting timings.

* * * * *

UNITED STATES PATENT AND TRADEMARK OFFICE
CERTIFICATE OF CORRECTION

PATENT NO. : 4,599,583

DATED : July 8, 1986

INVENTOR(S) : Shimozono et al.

It is certified that error appears in the above-identified patent and that said Letters Patent is hereby corrected as shown below:

Col. 1, line 68, after "period" insert --,--.

Col. 5, line 9, "t0" should be --$T_0$--.

Col. 6, line 53, "$D_{9a}$" should be --$D_{2a}$--;

"$D_{4a}$" should be --$D_{9a}$--.

Col. 7, line 1, "so force" should be --so on--;

"$D_{9a}$" should be --$D_{2a}$--;

"$D_{4a}$" should be --$D_{9a}$--;

line 59, after "lating" insert --$d_2=$ --.

Col. 8, line 18, "Di" should be --$D_i$--.

Signed and Sealed this

Eleventh Day of November, 1986

Attest:

DONALD J. QUIGG

Attesting Officer   Commissioner of Patents and Trademarks